SIGNAL COMPRESSION OR EXPANSION SYSTEM USING VARIABLE AZIMUTH MAGNETIC RECORDING

Filed Aug. 16, 1965

INVENTOR.
MARVIN CAMRAS
BY James W. De Simone
ATTY.

United States Patent Office 3,527,898
Patented Sept. 8, 1970

3,527,898

SIGNAL COMPRESSION OR EXPANSION SYSTEM USING VARIABLE AZIMUTH MAGNETIC RECORDING

Marvin Camras, Glencoe, Ill., assignor to IIT Research Institute, Chicago, Ill., a not-for-profit corporation of Illinois Filed Aug. 16, 1965, Ser. No. 480,001
Int. Cl. G11b *5/02, 5/56;* H04b *1/66*
U.S. Cl. 179—100.2 9 Claims

ABSTRACT OF THE DISCLOSURE

Method and apparatus for audio signal compression or expansion using a stationary longitudinal scan type playback head whose azimuth is adjustable relative to oblique lines of magnetization on the record and which playback head is automatically shifted laterally as a function of azimuth adjustment to limit scanning to one line of magnetization at a time, the playback speed being adjusted automatically in proportion to head azimuth adjustment to maintain pitch.

This application is directed to a magnetic transducer system and more specifically to a system for signal compression (or expansion) wherein the playback time interval is variable and is reproduced by a stationary magnetic head.

If an ordinary tape recording is speeded up the pitch of the sound is changed, rapidly becoming unintelligible for increases beyond about 5% of the original intended tape speed. To overcome this problem speech compressors have been developed which allow speeding up or slowing down a tape without changing the pitch of the sound recorded thereon. Speed variations as high as about 90% of recorded tape speed are possible with these devices. Speech compressors are useful for reducing the band width of the recorded signal, or to tailor a recording to an exact time interval. They are also useful in acoustic research. Heretofore, such compressors required specially driven rotating heads with commutators and complex controls for regulating head rotation.

The present invention obviates the need for such complex electro-mechanical equipment by the novel arrangement hereinafter to be described. It is accordingly an object of this invention to provide an improved, novel speech compressor involving a stationary magnetic playback head.

It is a further object of this invention to provide a novel improved speech compressor involving a stationary but angularly rotatable magnetic transducer playback head.

It is a further object of this invention to provide a novel speech compressor including a stationary but angularly rotatable magnetic transducer head in combination with a special magnetic record member.

It is a further object of this invention to provide a novel magnetic transducer system which permits variance of playback time without substantially altering the intelligibility of the recorded signal.

It is a further object of this invention to provide a novel magnetic transducer system which permits variance of playback time without substantially altering the intelligibility o fthe recorded signal in combination with a special magnetic record member.

The foregoing and additional objects will become more apparent to the reader from the detailed description to follow taken in connection with the accompanying drawings in which.

Figure 1:
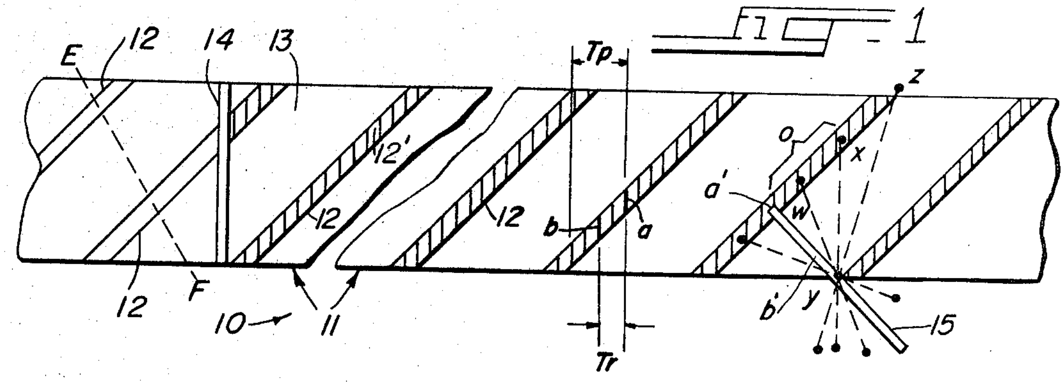
FIG. 1 is a schematic representation useful in explaining the theory of operation of the system.

With reference to FIG. 1, a special tape 11 is arranged to pass across a recording head 14. The gap of head 14 is at right angles to the direction of tape travel which direction is indicated by the arrow 10. Tape 11 has a series of diagonal magnetic stripes 12 on its surface with blank non-magnetic spaces 13 interspersed therebetween. The angle of magnetic stripe 12 is chosen according to conditions hereinafter described and is shown at about 45° from the horizontal in the figures. As an example the tape may be 0.25 inch wide, with stripes 0.005 inch wide, separated 0.12 inch along the tape axis (direction of tape movement).

After recording (symbolized by traces 12') tape 11 passes across a playback head 15. The gap angle of head 15 is variable. Head 15 is arranged so that it can be relatively angularly varied with respect to tape 11. Exemplary positions are shown at the right hand portion of FIG. 1 by the dotted lines Z, X, W, etc.

If the gap of head 15 were parallel to that of record head 14 (as indicated by the dashed line X), playback would be normal. That is to say, the pitch of the reproduced signal would be unaltered from that of the recorded signal when the tape is driven at the same speed as it was during recording. However, if head 15 is rotated so that its gap is not at right angles to the tape but as indicated in FIG. 1, then a recorded wavelength $T_r$ travels a longer distance $T_p$ while being played back by the tilted gap 15. This is apparent by noting that the leading edge of the wavelength *a* first reaches the playback gap at *a'* but the trailing edge *b* departs from the playback gap at *b'*. It will be observed that $T_p$ (playback wavelength) is approximately twice as long as $T_r$ (record wavelength). Under these conditions, in order to retain natural pitch of the recorded signal, tape 11 must be driven at twice the speed used during recording. By doubling tape speed, playing time is halved, resulting in a 2:1 compression ratio. That is to say, the playback time is one-half the time normally required to play back substantially the same signal had both recording and playback head gap angles been the same. Of course, the compression ratio is variable and can be less or more than 2:1 depending on the particular situation.

In accomplishing compression, there is some sacrifice. The shortened playing time is at the expense of omitting a part of the recorded signal. That portion of stripe 12 not scanned by head 15 is indicated at "0." Signal omission is an inherent function of the degree of compression, being zero at zero compression (playback gap perpendicular to the tape axis dotted line X), 50% at a 2:1 compression, etc. When the playback gap is tilted clockwise (dotted line Z), expansion occurs and there is overlap and repetition of portions of the recorded sound. In the overlapping portions the signal is simultaneously recorded on the trailing edge of one stripe and the leading edge of the next stripe. With about 3 magnetic stripes per inch of tape and operating speeds of from 7½ to 15 inches per second the interruption rate varies from about 22–45 interruptions per second. With interruptions within the range described the sound is not seriously changed. In other words, the audible sounds are normal (same pitch) but more rapid, i.e., with little change in tone. It merely sounds as though the speaker were talking faster. The term pitch as used in this application is intended to mean audio frequency.

The basis for operation of speech compressors is that spoken communication is redundant, so that each syllable can be shortened by omitting a part of it, and the intelligibility is still retained. With speech expansion each syllable is repeated in part, making it last longer and slowing down the rate of talking. A compressor or expander is also useful for singing, music, and other forms of audible intelligence.

With reference to the illustrated head position, counterclockwise rotation of head 15 coupled with an appropriate tape speed increase provides more compression. Similarly, clockwise rotation of head 15 provides less compression. If head 15 were rotated to Z (less than 90°) and tape speed reduced, expansion is actually obtained. With speech expansion the rate of talking (to the listener) is slower than the recorded rate. Thus it will be observed that by controlling the playback gap angle and tape speed the pitch will remain substantially the same but the playback rate will vary in proportion to the degree of compression or expansion desired.

Figure 2:
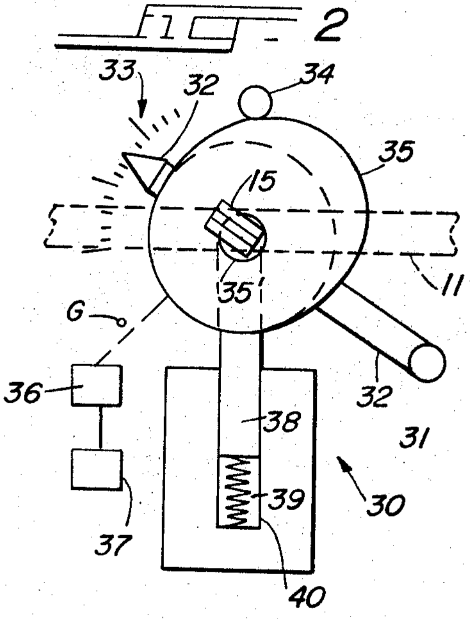
FIG. 2 is an illustration of a single means for controlling the gap angle and position of the playback head and playback tape speed.

It is further noted that as the gap angle of head 15 changes, the gap is moved partly beyond the edge of tape 11 so that it leaves one stripe 12 as soon as the next stripe comes along. This is accomplished by mounting head 15 on a cam 35 as illustrated in FIG. 2. For ease of operation, a master control 30, calibrated in degree of expansion or compression, may be coupled to adjust the angular orientation of head 15. It is also desirable to couple motor speed control 36 to master control 30 so that the tape speed is appropriately changed. In this way the degree of expansion of compression is set by a single control.

Master control 30 includes an arm 31 attached to cam 35. Head 15 is mounted to the bottom of cam 35 in the tape travel path and is rotated thereby. One end 32 of arm 31 is pointed and is positioned above a calibrated scale 33 so that when head 15 is positioned the degree of expansion or compression is automatically indicated on scale 33. Control assembly 30 is mechanically coupled to motor control 36 to control the speed of tape drive motor unit 37. Alternatively, motor speed control 36 can be built into and form a part of control assembly 30. For example, turning the assembly 30 may move a friction driving pinion to a different position on a capstan drive disc.

Cam 35 is eccentric to the degree that the axis of head 15 moves further away from the center line of tape 11 as the degree of compression is increased and vice-versa. Cam 35 rotates about its axis and is displaced by its degree of eccentricity by cam follower 34 which is permanently fixed to the unit. The degree of eccentricity is such that the span of the gap of head 15 will not scan more than one stripe 12 at a time. Thus, when the gap is at right angles to the tape axis, the gap spans the portion of tape XY of FIG. 1. When at about 45° as shown, it spans the portion $a'$Y. When at about 15° clockwise (for expansion) it spans the portion ZY. Cam 35 is continuously urged against cam follower 34 by push rod 38 seated in housing 40 with spring 39 biasing rod 38 against cam 35. Push rod 38 is attached to cam pivot 35'.

By this arrangement one control accomplishes all the adjustments as well as providing a visual indication of the compression (expansion) ratio.

Figure 3:
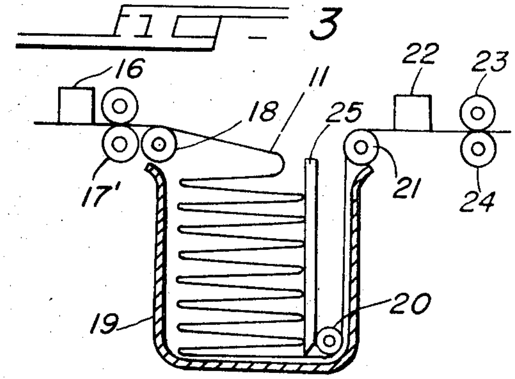
FIG. 3 shows a record/playback speech compressor system including means to accommodate for variances between record and playback tape speeds.

In FIG. 3 an arrangement for record and/or playback is shown. A reservoir 19 is included because recording and playback tape speeds can be different. With 2:1 compression, playback may commence after half the recording time has lapsed and in the remaining record interval the tape reservoir is depleted. During expansion, playback can start with recording but would be at a slower speed and thus excess tape 11 will be stored in the reservoir 19. Record head 16 is disposed at right angles to the tape 11 in its threading path and arranged to record on the stripes 12. Tape 11 is pulled past head 16 by capstan 17 and pinch roller 17'. Tape 11 then passes over guide roller 18 into reservoir 19. Disposed within reservoir 19 is another guide roller 20 which is arranged to prevent tangling of tape 11 as it is drawn out of reservoir 19. A baffle 25 is mounted in reservoir 19 to prevent tangling of tape 11. Guide roller 21 is disposed near the top of reservoir 19 to guide the tape into a playback threading path. The tape is pulled out of reservoir 19 and past head 22 by capstan 23 and pinch roller 24 onto an appropriate take-up reel (not shown). Separate capstan drives are necessary in this embodiment because the record tape speed will usually be fixed and the playback tape speed will be variable.

Figure 4:
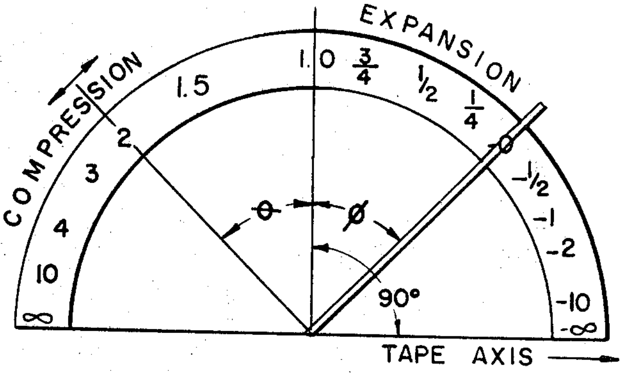
FIG. 4 is a graphic illustration of the relationship between playback gap angle and compression ratio useful in describing the concepts involved in this invention.

Analysis shows that as playback gap angle varies, the compression ratio varies in accordance with the angular relationship depicted in FIG. 4. The limits of compression can vary from zero to infinity. Fractional values of compression are equivalent to expansion. Negative values of compression, in the first quadrant signify reverse scanning. The relation of gap angle to compression ratio is expressed by $$R=1+\frac{\tan\theta}{\tan\phi}$$

where R is the compression ratio and $\theta$ and $\phi$ are the angles of the playback gap of head 15 and angles of stripes 12 respectively (the recording gap being at right angles to the tape).

A striped tape such as depicted in FIG. 1 can be manufactured by several different techniques. One such technique would be to mask the desired portions of a conventional magnetic record member to correspond to strips 12 and to wipe away the remaining magnetic coat with a solvent moistened swab on mill-width tape before slitting.

Obviously, magnetic tape of this type can be machine produced as will be obvious to those skilled in the art. The spacing and slope of stripes 12 is variable. Some principles involved in the choice are:

Spacing $d$ between stripes along the axis of the tape is chosen such that $$d=s/n$$

where $s$ is the velocity of tape during playback, and $n$ is a number between 10 and 150 but preferably between 20 and 80. For example, if $s=15$ inches per second and $n=60$ the stripes will be 0.25 inch apart. If $n$ is too low the reproduction will appear choppy while if it is too high an audible tone will be superposed on the desired sound.

The width of the magnetic stripes is a compromise. In the above example a width of about 0.015 inch was found to be satisfactory. A narrower stripe reduces the signal level, while a wider stripe gives more azimuth degradation of high frequencies when the playback gap is tilted.

The angle of the stripes with respect to the tape axis is determined by $$\alpha=\arctan\frac{h}{d}$$

where $\alpha$ is the angle of stripes 12 with respect to tape axis, $h$ is the span of the playback gap when it is at right angles to the tape axis (compression ratio=1, signal unchanged) and $d$ is the distance between stripes as before. If expansion is not required, but only compression, $h$ can be equal to the full width of the tape, $w$. The angle will then be equal to $$\arctan=\frac{w}{d}$$

Where $h$ is less than $w$, the angle will be smaller.

The above considerations apply for a right angle record gap. However, this also can be different when the record gap is at another angle (viz., dotted EF FIG. 1), but similar analysis applies.

Where considerable expansion is required the recording head is aranged to be set at a selected angle in a counterclockwise direction as for example at EF in FIG. 1, the recording gap being wide enough to cover the tracks. Upon playback the calibration scale will be changed, but the cam arrangement will still be operative. The range in the expansion direction will be increased at the limit where the playback head covers the entire recorded track width.

Expansion will be greater if the playback head 15 is turned at an angle greater than this limit, but the sound will be intermittent because there will be intervals when the track does not contact the head. If expansion beyond the limit is required, the recording should be made with the recording head turned counterclockwise still further. A stop G (FIG. 2) may be positioned so that the head cannot be turned far enough to lose contact with the track.

On the other hand, if high degrees of compression are normal, the recording head may be set at a clockwise angle relative to the perpendicular position indicated in FIG. 1. The playback head then covers a wider portion of tape, improving the signal to noise ratio.

As an alternative to the striped tape, the tape may have a continuous coating, with the non-magnetized portions being formed by intermittent demagnetization after recording. As another alternative the non-magnetic and magnetic segments on the tape may be formed on a continuous tape layer by differential chemical or heat treatment. As a further alternative, depressions may be formed in the tape backing, and filled with magnetic material.

From the foregoing it will be obvious that because of the freedom from complexity of the disclosed system widespread application heretofore economically unsound is now possible. For example, the invention may be incorporated into dictation machines. It is known that the human ear can intelligibly accept information at a faster rate than the human voice can deliver it. Thus, the listener can adjust the playback time (rate) to compensate for the recorder's and listener's capabilities without substantially changing the pitch or intelligibility of the recorded signal.

Obviously modifications will occur to those skilled in the art without departing from the novel concepts of this invention it being intended that this invention only be limited by the scope of the following claims.

I claim as my invention:

1. A magnetic transducer system for varying playback time without substantially changing the pitch of the recorded signal, for use with an elongated magnetic record member movable in the direction of its length and having a series of spaced magnetizable stripes extending across the width and spaced along the length thereof and having a recorded signal produced by a magnetic recording head having a recording non-magnetic gap positioned at an angle to the stripes, the lateral extent of said recording non-magnetic gap being such that the recording non-magnetic gap enters into scanning relation to a second one of said stripes prior to terminating transducing relation with a first of said stripes, said system comprising:

adjustable speed drive means for driving the record member in the direction of its length at a selectively adjustable speed;

a magnetic reproducing head having a non-magnetic scanning gap disposed at an angle to the stripes and in scanning relation with the record member;

means for selectively rotating said reproducing head to vary the angle between said stripes and the scanning gap of said reproducing head, the last said angle being always of the same sign as the angle between said stripes and said recording non-magnetic gap of said magnetic recording head; and means for shifting the reproducing head laterally relative to the record member in proportion to the degree of rotation of the reproducing head as the angle between said stripes and the scanning gap increases.

2. A magnetic transducer system for varying playback time without substantially changing the pitch of the recorded signal, comprising:

an elongated magnetic record member movable in the direction of its length and having a series of magnetizable stripes extending across the width and spaced along the length thereof;

a magnetic recording head having a recording non-magnetic gap positioned at an angle to the stripes for producing the recorded signal, the lateral extent of said gap being such that the recording non-magnetic gap enters into scanning relation with a second of said stripes prior to terminating scanning relation with a first of said stripes;

adjustable drive means for driving the record member in the direction of its length at a selectively adjustable speed;

a magnetic reproducing head having a non-magnetic scanning gap disposed at an angle to the stripes and in scanning relation with the record member;

means for selectively rotating said reproducing head to vary the angle between said stripes and the scanning gap of said reproducing head, and the last said angle being always of the same sign as the angle between said stripes and said recording non-magnetic gap of said magnetic recording head; and means for shifting the reproducing head laterally relative to the record member in proportion to the degree of rotation of the reproducing head as the angle between the stripes and the scanning gap increases.

3. A magnetic transducer system for varying playback time without substantially changing the pitch of the recorded signal, for use with an elongated magnetic record member movable in a direction of its length and having a series of spaced magnetizable stripes extending across the width and spaced along the length thereof, said system comprising:

a magnetic recording head having a recording non-magnetic gap positioned at an angle to the stripes, the lateral extent of said recording non-magnetic gap being such that the recording non-magnetic gap enters into scanning relation to a second of said stripes prior to terminating scanning relation with a first of said stripes;

adjustable speed drive means for driving the record member in said direction of its length at a selectively adjustable speed;

a magnetic reproducing head having a non-magnetic scanning gap disposed at an angle to the stripes and in scanning relation with the record member;

means for selectively rotating said magnetic reproducing head to vary the angle between said stripes and said scanning gap of said reproducing head, the last said angle being always of the same sign as the angle between said stripes and the recording non-magnetic gap of the recording head; and means for shifting the reproducing head laterally relative to the record member in proportion to the degree of rotation thereof as the angle between the stripes and the scanning gap of the reproducing head increases.

4. A magnetic transducer system for varying playback time without substantially changing the pitch of the recorded signal comprising:

an elongated magnetic record member movable in the direction of its length and having a series of diagonal spaced magnetizable stripes extending across the width and spaced along the length thereof;

a magnetic recording head having a recording non-magnetic gap disposed at right angles to the length of said record member for producing the recorded signal, the lateral extent of said recording non-magnetic gap being such that the recording non-magnetic gap enters into scanning relation to a second of said stripes prior to terminating scanning relation with a first of said stripes;

adjustable speed drive means for driving the record member in the direction of its length at a selectively adjustable speed;

a magnetic reproducing head having a non-magnetic scanning gap disposed at an angle to the stripes and in scanning relation with the record member;

means for selectively rotating said reproducing head to vary the angle between said stripes and the scanning gap of the reproducing head, the last said angle being always of the same sign as the angle between said stripes and the recording non-magnetic gap; and means for shifting the reproducing head laterally relative to the record member in proportion to the degree of rotation thereof as the angle between said stripes and said scanning gap increases.

5. A magnetic transducer system for varying playback time without substantially changing the pitch of the recorded signal, for use with a magnetic record member having an elongated track and having a series of spaced magnetizable stripes extending across the width of the track and spaced along the length of the track, and a magnetic recording head having a recording non-magnetic gap positioned at an angle to the stripes, the lateral extent of said recording non-magnetic gap being substantially equal to the width of said track and recording the signal along the stripes of said track during movement of the track at a predetermined recording speed, said system comprising:

adjustable speed drive means for driving the record member in the direction of the length of said track at selectively adjustable speeds in excess of said recording speed;

a magnetic reproducing head having a non-magnetic scanning gap disposed at an angle to the stripes and in scanning relation with the record member;

means for selectively rotating said reproducing head to vary the angle between said stripes and the scanning gap of said reproducing head, the last said angle being always of the same sign as the angle between said stripes and the recording non-magnetic gap; and means for shifting the reproducing head laterally relative to said track in proportion to the degree of rotation of said reproducing head as the angle between said stripes and the scanning gap increases.

6. A magnetic transducer system for varying playback time without substantially changing the pitch of the recorded signal, for use with a magnetic record member having an elongated track movable in the direction of its length and having a series of spaced magnetizable stripes extending across the width of the track and spaced along the length of the track, and a magnetic recording head having a recording non-magnetic gap positioned at an angle to the stripes, the lateral extent of said recording non-magnetic gap being such that the recording non-magnetic gap enters into scanning relation to a second of said stripes prior to terminating scanning relation with a first of said stripes, said system comprising:

adjustable speed drive means for driving the track in the direction of its length at a selectively adjustable speed;

a magnetic reproducing head having a non-magnetic scanning gap disposed at an angle to the stripes and in scanning relation with the track;

means for selectively rotating said reproducing head to vary the angle between said stripes and the scanning gap of said reproducing head, the last said angle being always of the same design as the angle between the stripes and the recording non-magnetic gap; and means providing for the scanning of a reduced lateral extent of the successive stripes in proportion to the degree of rotation of said reproducing head as the angle between said stripes and said scanning gap increases.

7. A magnetic transducer system for varying playback time without substantially changing the pitch of the recorded signal, for use with a magnetic record member having an elongated track movable in the direction of its length and having a series of spaced magnetizable stripes extending across the width of the track and spaced along the length of the track, and a magnetic recording head having a recording non-magnetic gap positioned at a angle to the stripes, the lateral extent of said recording non-magnetic gap covering the width of said track to record the signal along the successive stripes in a substantially continuous manner, said system comprising:

adjustable speed drive means for driving the track in the direction of its length at a selectively adjustable speed;

a magnetic reproducing head having a non-magnetic scanning gap disposed at an angle to the stripes and in scanning relation with the track;

means for selectively rotating said reproducing head to vary the angle between said stripes and the scanning gap of the reproducing head, the last said angle being always of the same sign as the angle between the stripes and the recording non-magnetic gap; and means providing for the scanning by said magnetic reproducing head of a progressively reduced lateral extent of said stripes in proportion to the degree of rotation of said reproducing head as the angle between said stripes and said scanning gap increases.

8. A magnetic transducer system for varying playback time without substantially changing the pitch of the recorded signal, comprising:

a magnetic record member having an elongated track with a width $w$ and having a series of spaced magnetizable stripes extending across the width of the track with a distance $d$ therebetween with respect to the length dimension of the track, the stripes having a signal recorded thereon by means of a recording non-magnetic gap disposed at right angles to the length dimension of the track and the stripes forming an angle to the length dimension of the record member substantially equal to $$\arctan \frac{w}{d}$$

adjustable speed drive means for driving the track in the direction of its length at a selectively adjustable speed;

a magnetic reproducing head having a non-magnetic scanning gap disposed at an angle to the stripes and in scanning relation with the track;

means for selectively rotating said reproducing head to vary the angle between said stripes and the scanning gap, the last said angle being always of the same sign as the angle between the stripes and the recording non-magnetic gap; and means providing for scanning by the reproducing head of a progressively reduced portion of the lateral extent of the stripes in proportion to the degree of rotation of the reproducing head as the angle between the stripes and the scanning gap increases.

9. The method of reproducing a signal with compression which comprises:

supplying a record medium having an elongated track with the signal recorded along successive stripes extending across the width of the track and spaced along the length of the track, the signal being recorded by means of a recording non-magnetic gap positioned at an angle to the stripes and having substantially continuous scanning relation to the stripes during the recording operation, moving the track in the direction of its length for playback at substantially increased speed in comparison to the speed during recording, and scanning the lines by means of a scanning region disposed at an angle to the stripes having the same polarity as the angle of the recording non-magnetic gap to the stripes, the angle of the scanning region being such that the scanning takes place at substantially the same scanning rate as during recording in spite of the increased speed of movement of the track during playback and positioning the scanning region during playback so as to scan the stripes substantially one at a time.

References Cited

UNITED STATES PATENTS

| | | | |
|---|---|---|---|
| 2,906,827 | 9/1959 | Gordon | 179—100.2 |
| 3,066,196 | 10/1962 | Stern | 179—100.2 |
| 3,160,704 | 12/1964 | Hollingsworth | 179—100.2 |

FOREIGN PATENTS

| | | |
|---|---|---|
| 958,817 | 5/1964 | Great Britain. |

TERRELL W. FEARS, Primary Examiner

J. R. GOUDEAU, Assistant Examiner

U.S. Cl. X.R.

178—6.6; 179—15.55